(12) United States Patent
Pietrucha et al.

(10) Patent No.: US 11,478,102 B2
(45) Date of Patent: *Oct. 25, 2022

(54) SELF-CONTAINED ELECTRONIC BOILING AND STRAINING SYSTEM

(71) Applicant: Innovo Concepts, LLC, Des Plaines, IL (US)

(72) Inventors: Edward T. Pietrucha, Des Plaines, IL (US); Patrick J Tannous, Chicago, IL (US); Gabriel Prero, Chicago, IL (US); Brian C Conti, Chicago, IL (US); Marco F Serrano, Cicero, IL (US)

(73) Assignee: Innovo Concepts, LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/341,043

(22) Filed: Jun. 7, 2021

(65) Prior Publication Data
US 2021/0289974 A1 Sep. 23, 2021

Related U.S. Application Data

(63) Continuation of application No. 15/876,384, filed on Jan. 22, 2018, now Pat. No. 11,026,536.

(51) Int. Cl.
*A47J 25/00* (2006.01)
*A47J 27/00* (2006.01)
*A47J 36/08* (2006.01)
*A47J 27/21* (2006.01)

(52) U.S. Cl.
CPC ....... *A47J 27/004* (2013.01); *A47J 27/21175* (2013.01); *A47J 36/08* (2013.01); *A47J 2027/006* (2013.01)

(58) Field of Classification Search
CPC ............... A47J 27/004; A47J 2027/006; A47J 2027/008; A47J 37/12; A47J 37/1204; A47J 36/08
See application file for complete search history.

(56) References Cited

U.S. PATENT DOCUMENTS

| | | | | |
|---|---|---|---|---|
| 1,272,222 A | * | 7/1918 | Clayton | A47J 27/60 220/625 |
| 2,024,208 A | * | 12/1935 | Deschner | B67B 7/28 222/82 |
| 3,722,498 A | * | 3/1973 | Kimbrough | A47J 37/1242 126/38 |
| 4,684,038 A | * | 8/1987 | Gaul | B67B 7/28 30/445 |
| 4,832,226 A | * | 5/1989 | Leon | A47J 36/08 220/756 |

(Continued)

*Primary Examiner* — Paul R Durand
*Assistant Examiner* — Randall A Gruby
(74) *Attorney, Agent, or Firm* — K&L Gates LLP

(57) ABSTRACT

A cooking and draining system includes: a vessel including a bottom and an upstanding side wall forming an interior region of the vessel and an opening opposite the bottom of the vessel, the vessel further including: a heating element located in one of the bottom and the side wall; a valve located in one of the bottom and the side wall, the valve selectively controlling outflow of fluid from the interior region of the vessel; a lid selectively sealing the opening opposite the bottom of the vessel; and a base selectively coupled to the vessel and selectively causing the heating element to heat the interior region of the vessel.

9 Claims, 7 Drawing Sheets

(56) References Cited

U.S. PATENT DOCUMENTS

| | | | | |
|---|---|---|---|---|
| 5,189,946 A * | 3/1993 | Leon | ................ | A47J 36/08 |
| | | | | 99/410 |
| 6,080,968 A * | 6/2000 | Taylor | ................ | A47J 27/21041 |
| | | | | 219/432 |
| 6,330,849 B1 * | 12/2001 | Chao | ................ | A47J 27/2105 |
| | | | | 99/290 |
| 6,520,070 B1 * | 2/2003 | Heczko | ................ | A23L 2/39 |
| | | | | 426/115 |
| 7,278,349 B2 * | 10/2007 | Grant | ................ | A47J 41/00 |
| | | | | 222/475.1 |
| 7,539,402 B2 * | 5/2009 | Labelle | ................ | A47J 27/21166 |
| | | | | 392/444 |
| 8,076,620 B2 * | 12/2011 | Maupin | ................ | A23B 4/015 |
| | | | | 219/432 |
| 8,122,815 B2 * | 2/2012 | Wolfe | ................ | A47J 36/165 |
| | | | | 99/348 |
| 8,616,121 B1 * | 12/2013 | Hansalik | ................ | F24C 15/14 |
| | | | | 99/410 |
| 9,320,388 B2 * | 4/2016 | Storek | ................ | A47J 36/14 |
| 2007/0000906 A1 * | 1/2007 | Kaastra | ................ | A47J 27/21 |
| | | | | 219/441 |
| 2007/0190221 A1 * | 8/2007 | Tse | ................ | A23L 7/1975 |
| | | | | 426/618 |
| 2014/0044849 A1 * | 2/2014 | Khan | ................ | A47J 27/18 |
| | | | | 99/403 |
| 2017/0295987 A1 * | 10/2017 | Habram | ................ | A23F 5/26 |

\* cited by examiner

SELF-CONTAINED ELECTRONIC BOILING AND STRAINING SYSTEM

CROSS-REFERENCE TO RELATED APPLICATIONS

This application is a continuation application of U.S. patent application Ser. No. 15/876,384 filed Jan. 22, 2018, the entirety of which is incorporated herein by reference.

BACKGROUND OF THE INVENTION

The present subject matter relates generally to a boiling and straining system. More specifically, in a preferred embodiment, the present invention relates to self-contained electronic pasta cooking system.

Pasta is one of the oldest and most popular foods in the world. In its most basic form, it is composed of nothing more than flour and eggs combined into a food which feeds a significant portion of the world's population daily. Italy leads the way in pasta consumption, eating around 50 pounds of pasta a year per person. In America, the amount of pasta consumed per person per year is more in the range 15 pounds, but that still constitutes for around a quarter of the world's total pasta consumption per year due to America's vast size.

There is no single reason why pasta is so popular, however it is relatively simple to prepare, inexpensive, and considered to be delicious by many. Typically, pasta is prepared by boiling water in a pot, adding the pasta noodles (or other form of pasta) and letting the pasta cook to the preferred doneness. This preparation is not without its shortcoming however.

For many people, cooking in general can be a challenging task for many reasons. Rather it be age (too young or too old), disability, lack of time, or even lack of interest, many people do not regularly cook for themselves. For those who have physical limitations like the ones mentioned above and others, filing a pot with water and carrying it to the stove can be very difficult, if not impossible. For those with limited time or interest in cooking, the multistep process to cook pasta may act as an entry barrier to the activity. Additionally, many college students and enlisted military service personnel live in dormitories and barracks that lack a stove top upon which a pot of water can be boiled.

For all cooks, no matter their level of experience or physical attributes, cooking pasta well can be an additional challenge itself. To make perfectly cooked pasta noodles, it takes a keen eye and years of practice. Additionally, in a typical kitchen it can be difficult to control the temperature of the water in which pasta is cooked beyond bringing the water to a boil. Many pastas, particularly stuffed pastas like tortellini or ravioli must be cooked at a lower temperature to prevent them from rupturing. With all pasta, there is also the potential to overcook or undercook the pasta, with a pot of boiling water proving little assistance of guidance as to when the pasta is done.

Adding to the process, once pasta is cooked it must be strained. This process typically involves placing a strainer in a sink and dumping boiling pasta containing water into the strainer. The risk of burns is high, especially for someone with weaker upper body strength and is generally unpleasant for all as the process results in large amounts of steam being release into the pourer's face.

Although the above concerns are focused on cooking pasta, it is readily understood that there are similar issues with cooking rice, soups, and other foods in which there may be an advantage for having greater control over the cooking and straining process. Accordingly, there is a need for a self-contained electronic boiling and straining system.

BRIEF SUMMARY OF THE INVENTION

To meet the needs described above and others, the present disclosure provides a self-contained electronic boiling and straining system. In a primary embodiment, the system is a self-contained electronic pasta cooking system. However, it is contemplated that the system and principles taught herein may be embodied in any system for boiling and straining.

One embodiment of the present invention features a self-contained apparatus which requires only the addition of water, pasta, and electricity to cook pasta. The apparatus may feature a base, vessel, and lid. The vessel portion of the apparatus may itself feature a heating unit, removable grate, and triggered draining mechanism.

The base portion of the apparatus may include a wide footing to ensure stability, include various electronic components that enable the system to be powered through a connection to an electrical outlet, and a control interface through which end users can control the system. The apparatus may also be additionally or alternatively configured to run off external or internal battery power. In one design, the vessel portion of the apparatus may resemble a water pitcher with a handle on one side of the vessel. The vessel may sit upon a base with a removable lid operative at the top of the vessel. The lid portion may be ventilated to help regulate and safely boil pasta within the vessel.

The top of the vessel portion may be described as an opening through which the vessel can receive both water and pasta. The bottom of the vessel portion may contain the heating element, which operatively couples with the base to provide heat to the vessel via electrical power. The bottom of the vessel may also feature a resealable opening through which water may be drained once a given batch of pasta has been cooked. This resealable bottom opening may feature a removable grate (i.e., sieve) positioned between the opening and the interior of the vessel, enabling the drainage of water from the unit without wasting any pasta. The resealable bottom opening may be selectively sealed by a triggered drainage mechanism. This drainage mechanism may be placed inside the wall of the vessel and operated by a trigger in the vessel's handle. Once the trigger is activated, a valve sealing the bottom opening of the vessel opens and the water may be drained.

In one embodiment, a cooking and draining system includes: a vessel including a bottom and an upstanding side wall forming an interior region of the vessel and an opening opposite the bottom of the vessel, the vessel further including: a heating element located in one of the bottom and the side wall; a valve located in one of the bottom and the side wall, the valve selectively controlling outflow of fluid from the interior region of the vessel; a lid selectively sealing the opening opposite the bottom of the vessel; and a base selectively coupled to the vessel and selectively causing the heating element to heat the interior region of the vessel.

In some examples, the system includes a sieve positioned within the interior region of the vessel such that fluid flowing from the interior region through the valve flows through the lower sieve.

In other examples, the system includes a sieve positioned outside of the interior region of the vessel such that fluid flowing from the interior region through the valve flows through the lower sieve.

The vessel may include a handle including a user control that selectively secures and releases the vessel to the base. The user control may be, for example, a trigger. In some examples, the system further includes an additional release control whose operation in cooperation with the trigger is required to selectively release the vessel from the base. There may also be an additional valve control whose operation in cooperation with the valve is required to selectively open the valve.

The lid may include an upper sieve selectively positionable such that outflow of fluid from the top of the vessel may pass through the upper sieve.

The base may include an electronic control that detects when fluid in the interior region of the vessel has reached its boiling point. The base may additionally or alternatively include an electronic control that adjusts an amount of power provided to the heating element.

In another example, a pasta cooking system includes: a vessel including a bottom and an upstanding side wall forming an interior region of the vessel and an opening opposite the bottom of the vessel, the vessel further including: a heating element located in one of the bottom and the side wall; a sieve positioned within the interior region of the vessel such that fluid flowing from the interior region through the valve flows through the lower sieve; a valve located in one of the bottom and the side wall, the valve selectively controlling outflow of fluid from the interior region of the vessel; a lid selectively sealing the opening opposite the bottom of the vessel, wherein the lid includes an upper sieve selectively positionable such that outflow of fluid from the top of the vessel passes through the upper sieve; a base selectively coupled to the vessel and selectively causing the heating element to heat the interior region of the vessel, wherein the base includes an electronic control that adjusts an amount of power provided to the heating element; and a handle including a trigger that selectively secures and releases the vessel to the base and an additional release control whose operation in cooperation with the trigger is required to selectively release the vessel from the base.

A goal of the present system is to provide a simple, straightforward system that enables virtually anyone to cook pasta anywhere. The present system provides a self-contained apparatus that can be utilized by anyone with access to clean water and pasta. The system does require electricity, but given todays high-powered batteries, it is understood that the present system may operate via corded electric connection or as a portable, battery-powered system.

An advantage of the present system is that it is extremely safe to use. The dangers of a pot of boiling water are well-documented and may dissuade some from preparing pasta. The present system enables the boiling of water within a self-contained unit. This unit may integrate various safety features to prevent the water from getting too hot, the contents from catching fire, etc. Additionally, the portable design of the system prevents the need to carry hot liquids or hot premade dishes to various locations (e.g., a dinner party, tailgate, etc.). Instead, users of the system can carry ingredients to the location and efficiently prepare the dish upon arrival.

Another advantage of the present system is its ease of use. The vessel is intentionally designed to be familiar to users of modern conveniences, such as an electric tea kettle. Even for user's who have never cooked anything, the intuitive design of the present system enables user to quickly understand how to prepare food in it. Additionally, thanks to modern electronics integrated into the system, the cooking time and temperature can be automatically controlled, preventing a user from under or over cooking the pasta.

Yet another advantage of the present system is that it is extremely convenient to use. The present system prepares pasta by boiling water, cooking the pasta, and draining the pasta, in a convenient integrated process. The only thing left is to plate the pasta, which is made easy by the system—upon draining the vessel of water, only cooked pasta is left the vessel and easily plated. The entire process is accomplished through the single vessel instead of requiring a pot, strainer, and spoon.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
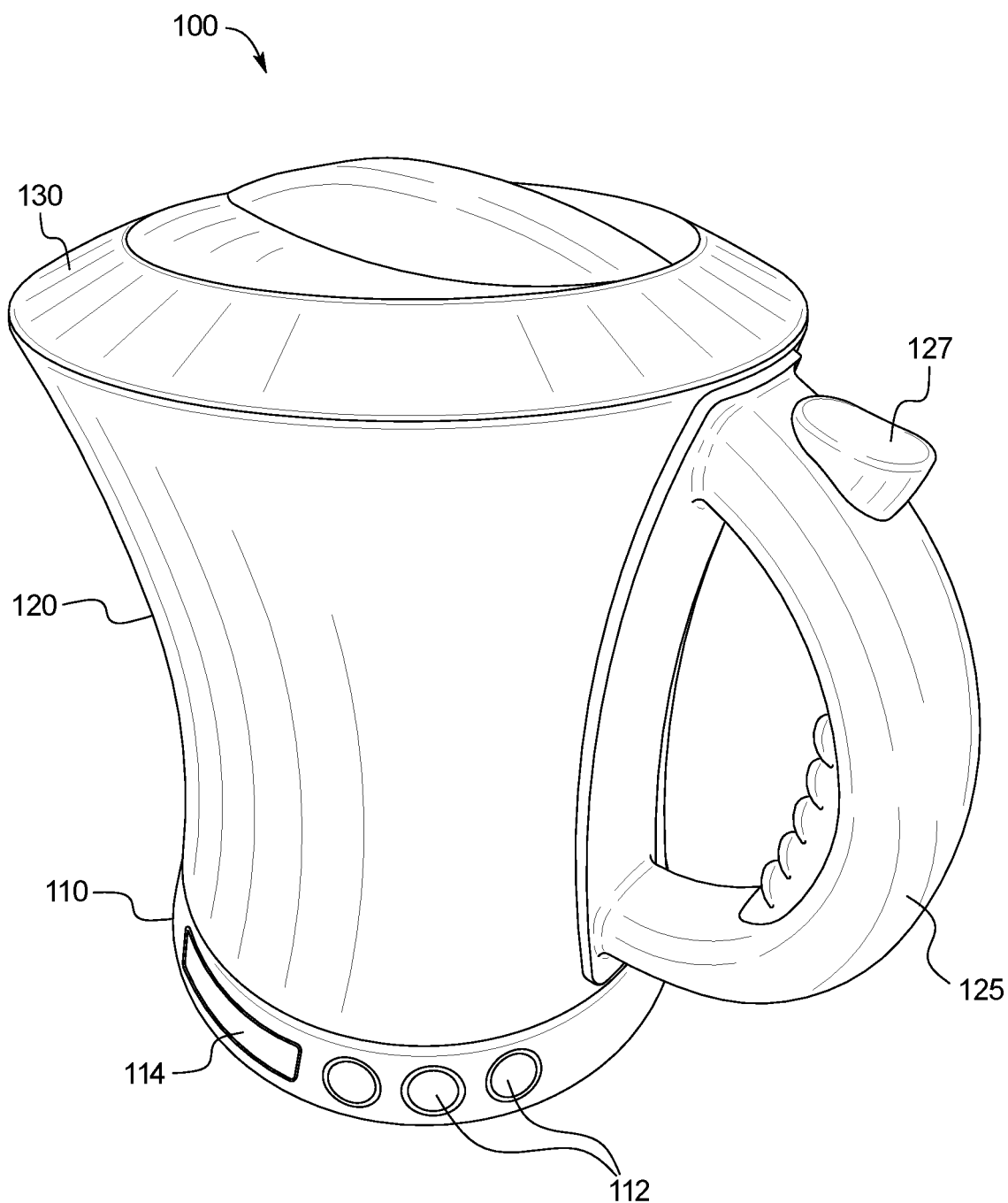
FIG. 1 is a perspective view of a self-contained electronic pasta cooking system 100.

FIG. 1 is a perspective view of a self-contained electronic pasta cooking system 100. As shown in FIG. 1, a self-contained electronic pasta cooking system 100 may be comprised of a base 110, vessel 120, and lid 130. The overall design of the system 100 me resemble an electronic tea kettle with similar controls to facilitate ease of use. The base 110 portion of the system 100 may feature electronic control buttons 112 and a display 114 which enable an end user to control various functions and features of the system 100. For example, a user may use the electronic control buttons 112 to turn the system 100 on and off, input the amount of pasta to be cooked, etc. The base 110 may also play a chime or trigger a buzzer when a batch of pasta is done cooking to alert a user.

The vessel 120 may be cylindrical in shape or have an hour glass profile as shown with dimensions which enable it to be supported by the base 110. The vessel 120 may feature a handle portion 125 which itself in turn has physical user controls 127 that enable the user to attach and detach the vessel 120 from the base 110, open various vessel 120 orifices to drain fluid from the vessel, etc.

The dimensions of the vessel 120 in this example are approximately eight inches high with a diameter of six inches. This size should enable the vessel 120 to hold around one-half pound of pasta and eight cups of water. However, the system 100 may be scaled in size and relative dimensions as needed and/or demanded by consumers.

The lid 130 portion of the system 100 sits upon the vessel 120 at the end opposite the base 110 and enables access to the interior of the vessel. Through this point of access, the end user can add pasta, water, other fluid, etc. before cooking, and enables the pasta to be easily poured from the vessel 120 once the pasta is cooked. The flared end of the vessel 120 which accommodates the lid 130 provides a shape similar to that of the pouring rim of a pitcher—allowing for the easy plating of cooked pasta.

Figure 2:
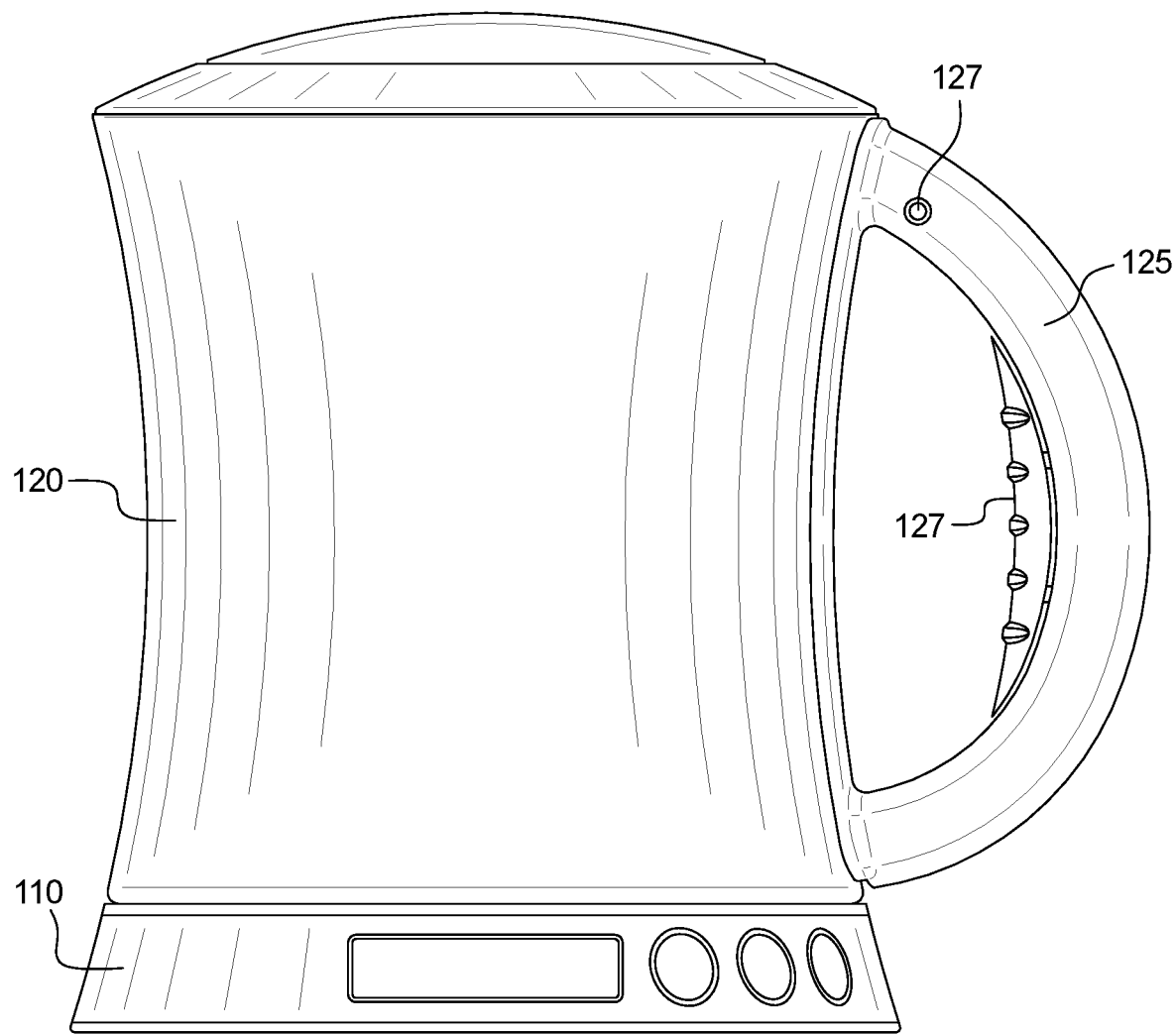
FIG. 2 is a side view of a self-contained electronic pasta cooking system 100.

FIG. 2 is a side view of a self-contained electronic pasta cooking system 100. As shown in FIG. 2, the handle portion 125 of the vessel 120 may feature various physical user controls 127 which require a user to physically depress a button, squeeze a trigger, etc. to, in this example, release the vessel from its base 110. In this example, an end user must activate two physical user controls 127 simultaneously in order to release the vessel 120 from its base 110. This is done to provide extra safety when handling a vessel of boiling water.

Figure 3:
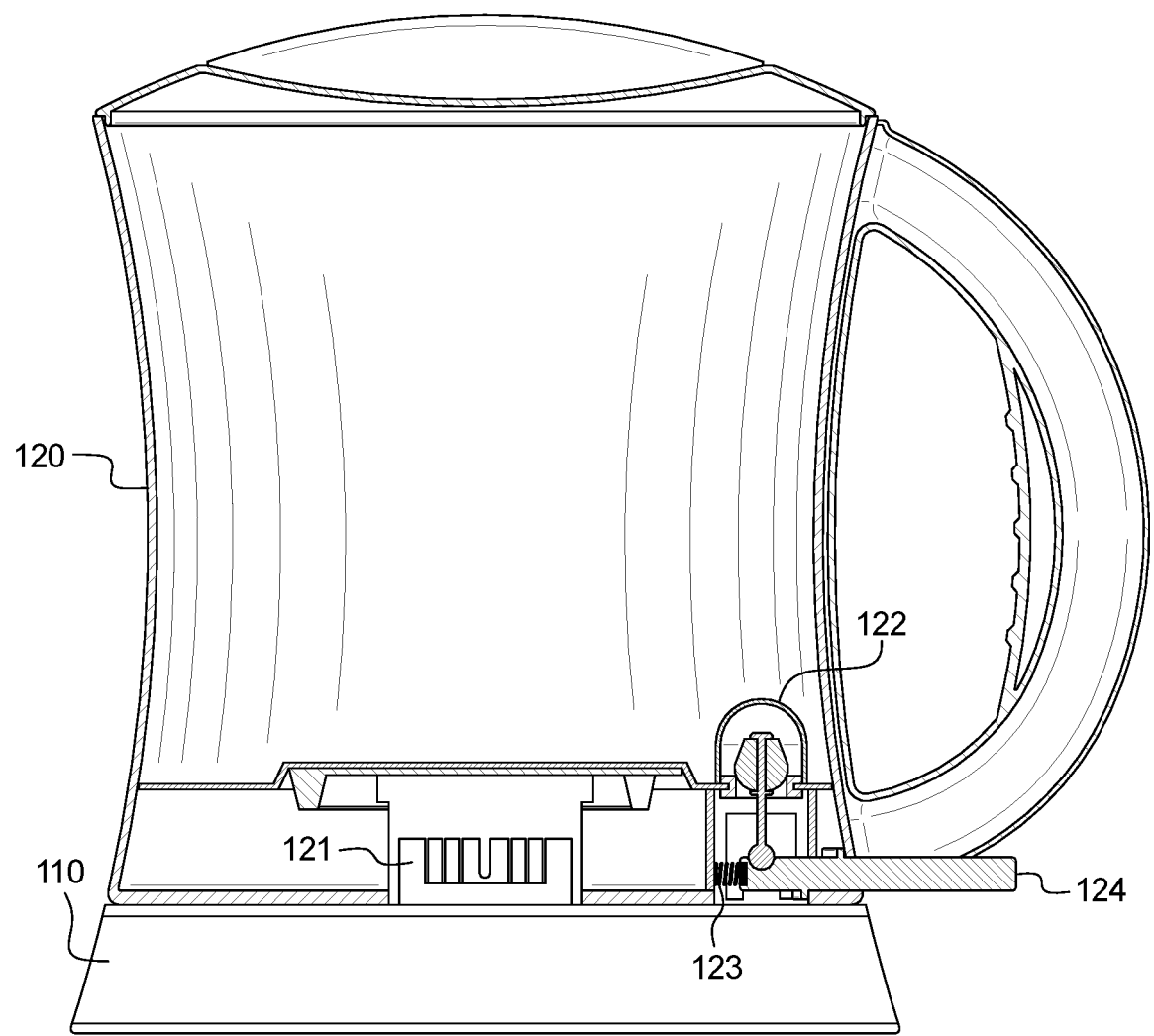
FIG. 3 is a cut-away side view of a self-contained electronic pasta cooking system 100.

FIG. 3 is a cut-away side view of a self-contained electronic pasta cooking system 100. As shown in FIG. 3, the vessel 120 portion may feature a heating element 121, sieve 122, outflow valve 123, and outflow valve control button 124. The heating element 121 may be located towards the bottom of the vessel 120 which enables it to heat the fluid and pasta placed into the interior of the vessel 120 efficiently and also draw power from the base 110. The outflow valve 123 may also be positioned at the bottom of the vessel 120 enabling fluid to be drained out of the vessel easily without the need for an end user to tip over the vessel 120.

Figure 4:
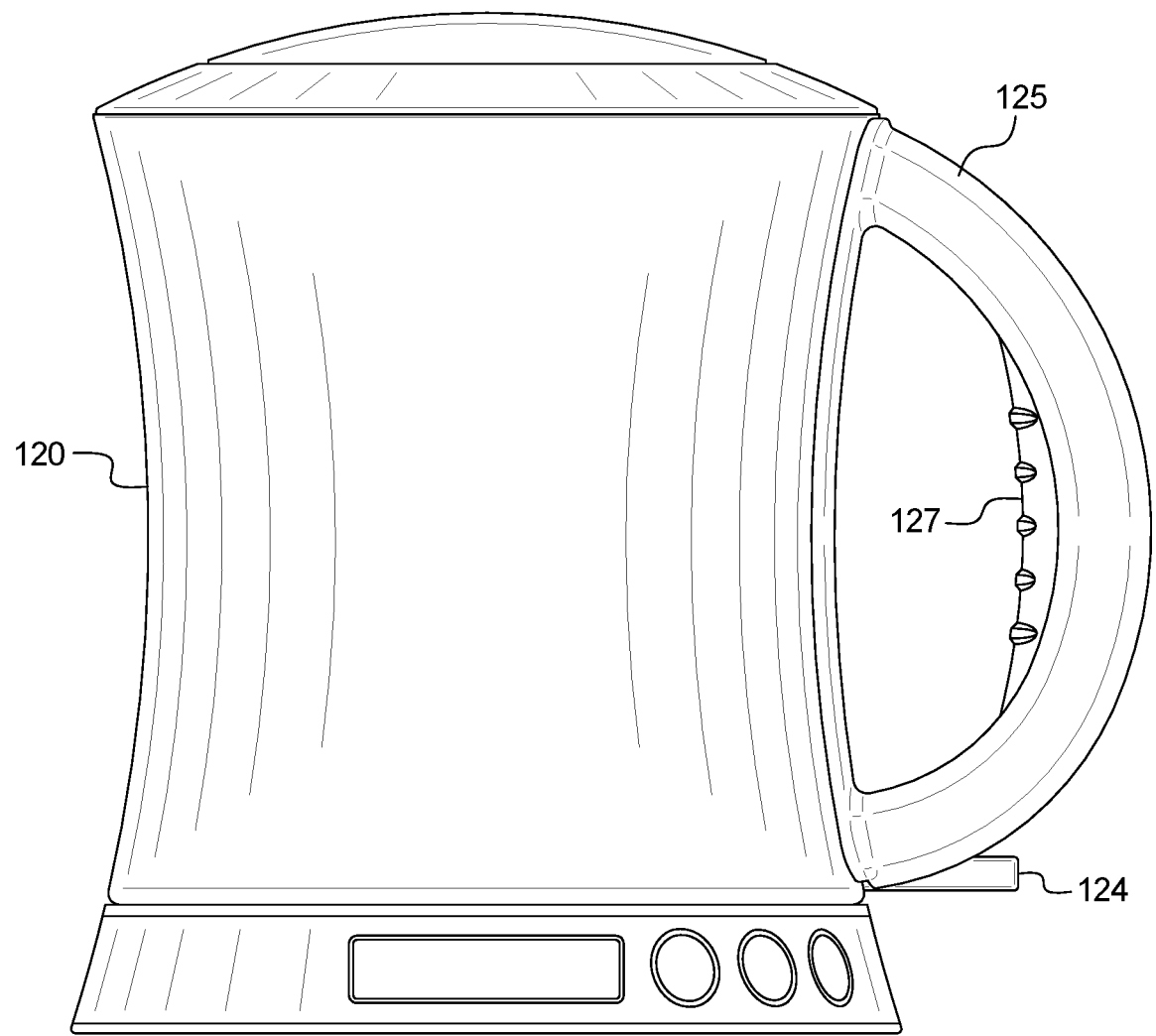
FIG. 4 is a side view of a self-contained electronic pasta cooking system 100 with an alternative control configuration.

FIG. 4 is a side view of a self-contained electronic pasta cooking system 100 with an alternative control configuration. As shown in FIG. 4, a pasta cooking system 100 may have any number of different control configurations. In this example, the outflow valve control button 124 is placed at the bottom base of the handle portion 125. Positioning the outflow control button 124 in this location in combination with a squeeze trigger physical user control 127 means the vessel 120 cannot be drained without the user having both hands out of the way of the outflow valve 123 (located on the bottom of the vessel 120).

Figure 5:
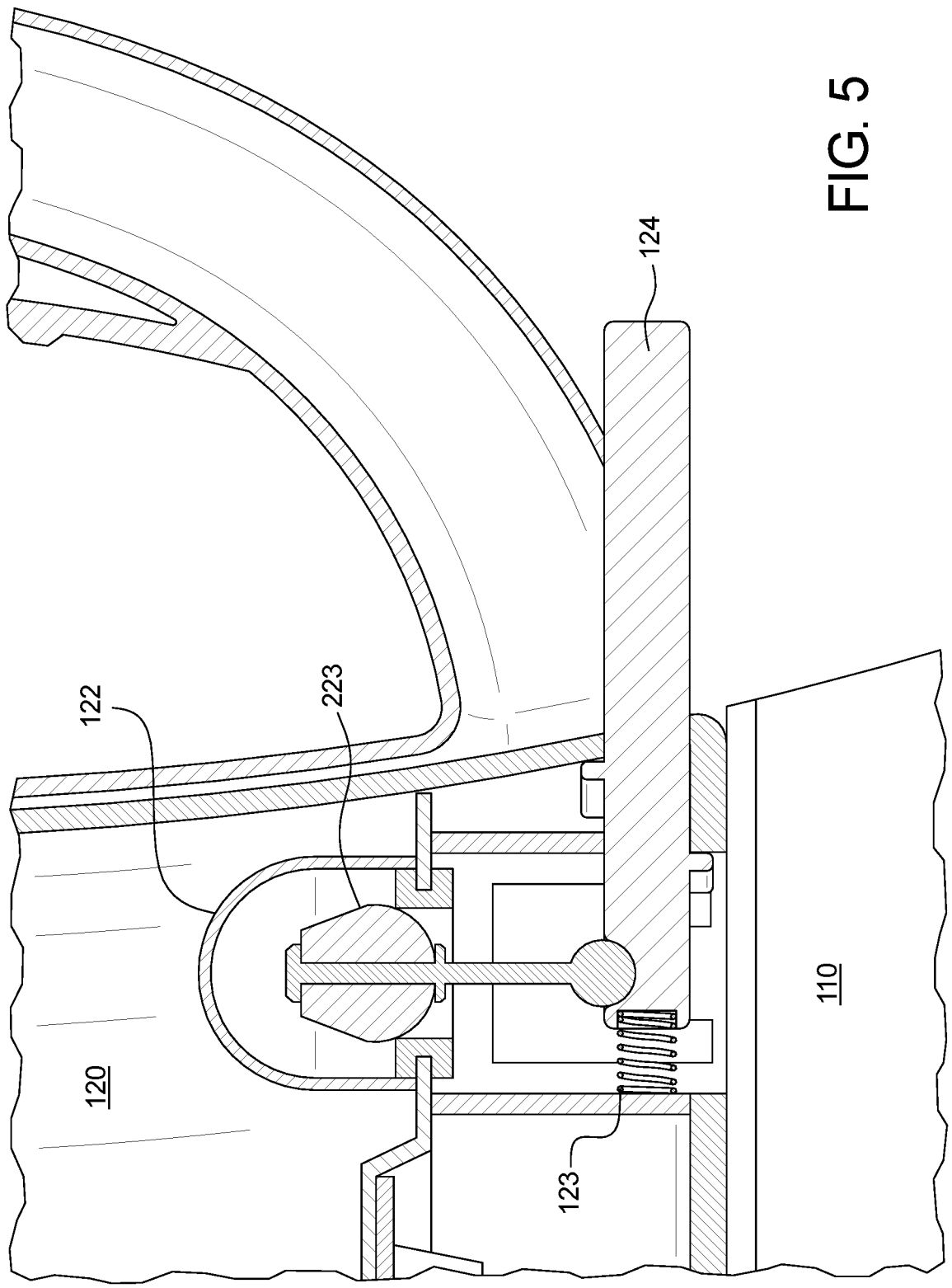
FIG. 5 is a close up cut away side view of the outflow valve 123 in a closed state.

FIG. 5 is a close up cut away side view of the outflow valve 123 in a closed state. As shown in FIG. 5, the outflow valve 123 may be located at the bottom of the vessel 120 which enables efficient and safe drainage of water or other fluid from the vessel 120. The valve 123 is positioned intentionally at the lowest point in the bottom of the vessel 120. When a user fills the interior of the vessel with fluid and pasta, the outflow valve 123 is in a closed state. This closed, water tight state prevents leakage of the vessel's 120 contents during fill, cooking, and prior to drainage. The seal is created, in this example, by use of a ball gasket 223 which seals the valve 123. The valve 123, ball gasket 223, and other components of the system 100 may be constructed from metal, silicone, or other material which can withstand the boiling temperature of water and other fluids. The materials used should also be food safe.

Located above the outflow valve 123 and ball gasket closure 223 is a sieve 122. The sieve 122 (also termed a strainer, filter, or colander) may, as is the case in this example, be positioned in such a way that, when the valve 123 is opened, all fluid escaping the vessel 120 must flow through the sieve 122. The use and positioning of the sieve 122 and valve 123 enable the drainage of virtually all fluid from the vessel 120 without the loss of any pasta. The sieve 122 may also be removable via threaded connection, etc. for cleaning.

Figure 6:
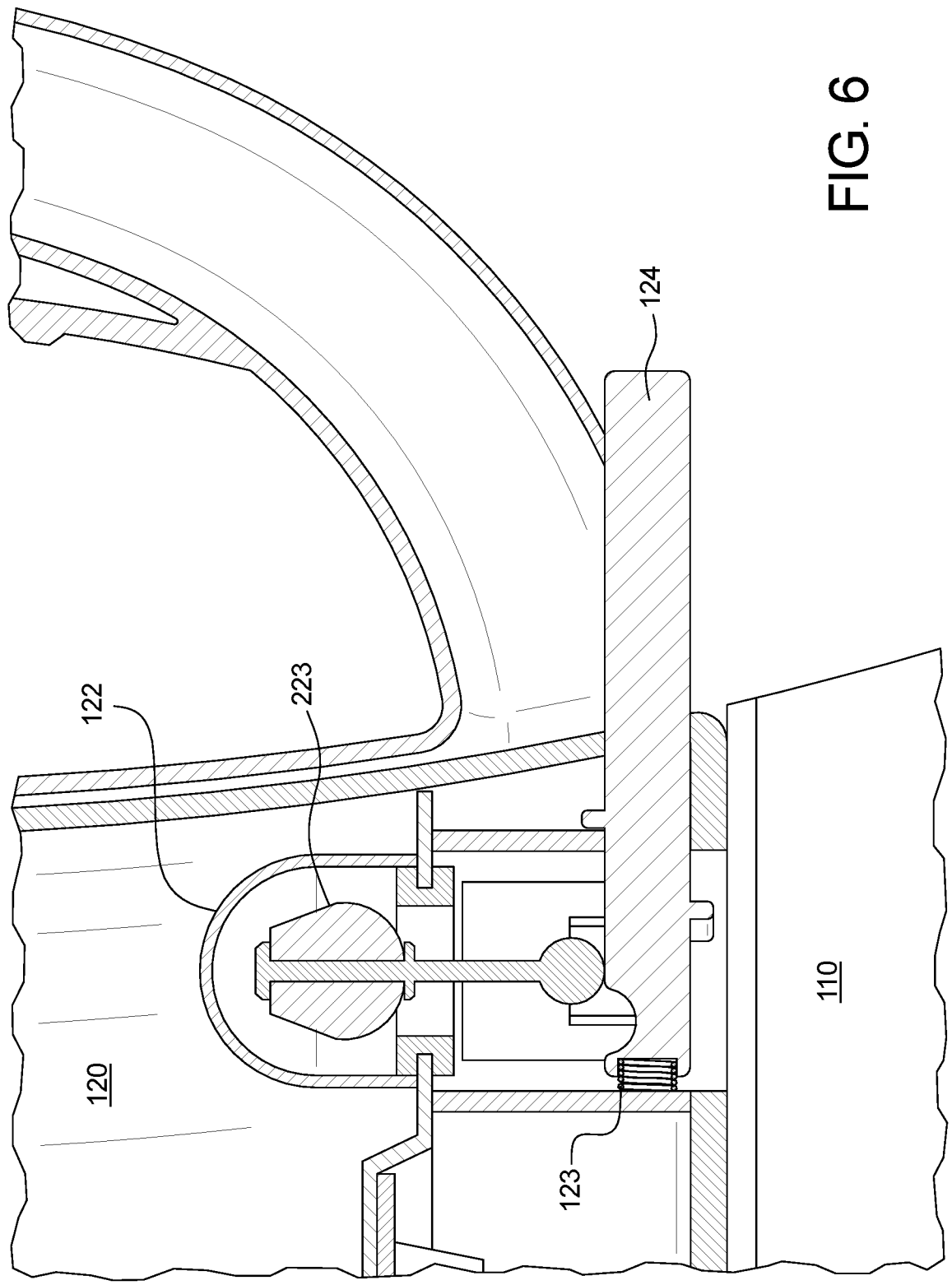
FIG. 6 is a close up cut away side vide of the outflow valve 123 in an open state.

FIG. 6 is a close up cut away side view of the outflow valve 123 in an open state. As shown is FIG. 6, when a user depresses the outflow valve control button 124, the ball gasket 223 is moved and the outflow valve 123 is opened. This allows all, or almost all, the fluid within the vessel 120 to be drained.

Figure 7:
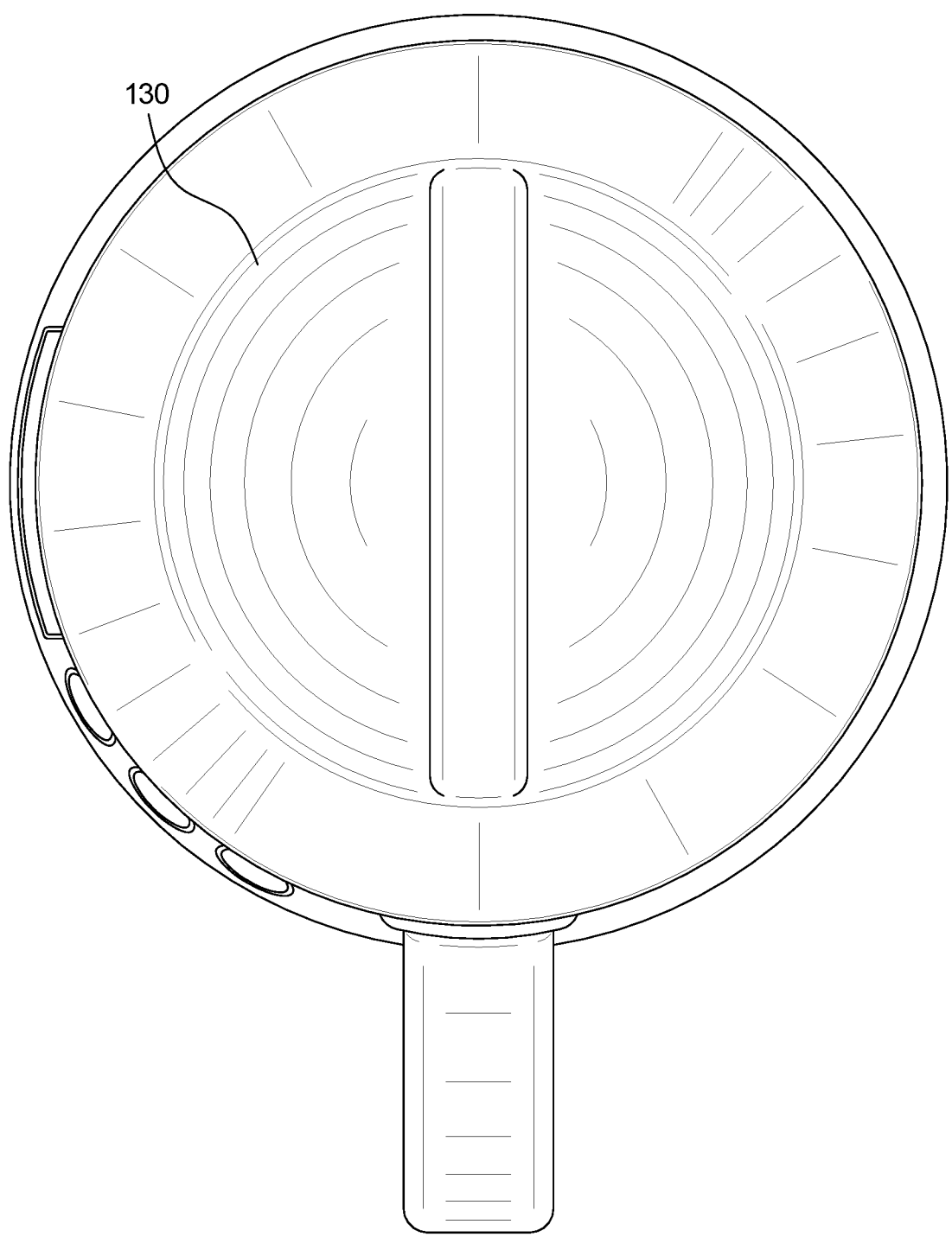
FIG. 7 is a top view of a self-contained electronic pasta cooking system 100.

FIG. 7 is a top view of a self-contained electronic pasta cooking system 100. As shown in FIG. 7, the lid 130 may feature a built-in strainer. This strainer may be accessed by manipulating the lid 130 (e.g., turning the lid in a given direction) with the user holding the lid in place and tipping the vessel 120 to drain. Such functionality is useful if an end user wishes to retain the fluid within the vessel 120 by dumping it into a pot, Tupperware, etc. One useful example of this system functionality could be in the preparation of broth quickly. Broth is typically made by boiling vegetables, meat, and various seasonings in a pot then draining the flavorful liquid and saving it for later use. The present system could easily boil these same ingredients and enable drainage of such liquid without the need to use any other kitchen utensils.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A method for cooking a pasta using the pasta cooking system, the method comprising:
   providing a pasta cooking system comprising:
      a vessel including a bottom and an upstanding side wall forming an interior region of the vessel and an opening opposite the bottom of the vessel;
      a heating element located in the vessel;
      a valve located in a resealable opening in the bottom of the vessel, the valve selectively controlling outflow of fluid from the interior region of the vessel;
      a valve control button extending from a side of the vessel;
      a sieve positioned about the valve and resealable opening atop the bottom and within the interior region of the vessel such that fluid flowing from the interior region through the valve flows through the sieve;
      a lid selectively sealing the opening opposite the bottom of the vessel; and
      a base selectively coupled to the vessel and selectively causing the heating element to heat the interior region of the vessel;
   inserting pasta and water into the vessel of the pasta cooking system through the opening opposite the bottom of the vessel;
   activating the heating element of the pasta cooking system to heat the pasta and water in the vessel;
   cooking the pasta in water within the pasta cooking system;
   depressing the valve control button to actuate the valve;
   draining water from the vessel through the valve; and
   emptying the pasta from the vessel through the opening opposite the bottom of the vessel.

2. The method of claim 1, further comprising the steps of:
removing the lid from the vessel prior to the step of inserting pasta and water into the vessel;
positioning the lid on the opening of the vessel prior to the step of activating the heating element of the pasta cooking system.

3. The method of claim 1, wherein the lid remains on the opening of the vessel while water is drained from the vessel.

4. The method of claim 1, wherein the step of emptying the pasta from the vessel through the opening opposite the bottom of the vessel further comprises, after draining the water from the vessel, removing the lid from the vessel, and pouring the cooked pasta onto a dish.

5. The method of claim 1, wherein the vessel includes a handle including a user control that selectively secures and releases the vessel to the base.

6. The method of claim 5, wherein a user control is a trigger.

7. The method of claim 6, wherein the vessel includes an additional release control whose operation in cooperation with the trigger is required to selectively release the vessel from the base.

8. The pasta cooking system of claim 1, wherein the base includes an electronic control that detects when fluid in the interior region of the vessel has reached its boiling point.

9. The pasta cooking system of claim 1, wherein the base includes an electronic control that adjusts an amount of power provided to the heating element.

\* \* \* \* \*